L. W. LUELLEN.
MACHINE FOR MAKING CONTAINERS.
APPLICATION FILED MAY 22, 1911.

1,193,574.

Patented Aug. 8, 1916.
12 SHEETS—SHEET 1.

Witnesses
James E. Lynch.
John Martin.

Inventor
Lawrence W. Luellen.
By Sylvanus H. Cobb.
Attorney

L. W. LUELLEN.
MACHINE FOR MAKING CONTAINERS.
APPLICATION FILED MAY 22, 1911.

1,193,574.

Patented Aug. 8, 1916.
12 SHEETS—SHEET 7.

Fig. 7.

Fig. 8.

Witnesses
James E. Lynch.
John Martin.

Inventor
Lawrence W. Luellen.
By Sylvanus H. Cole.
Attorney

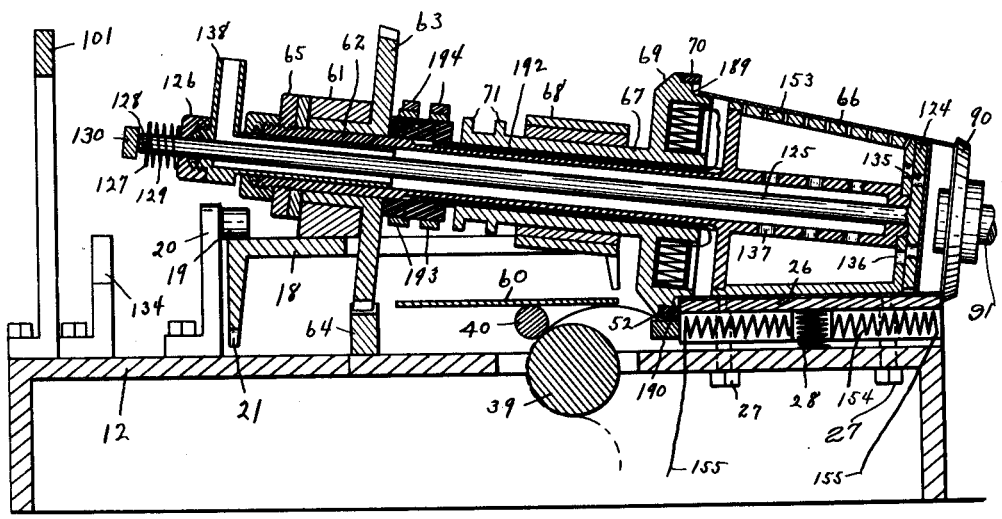
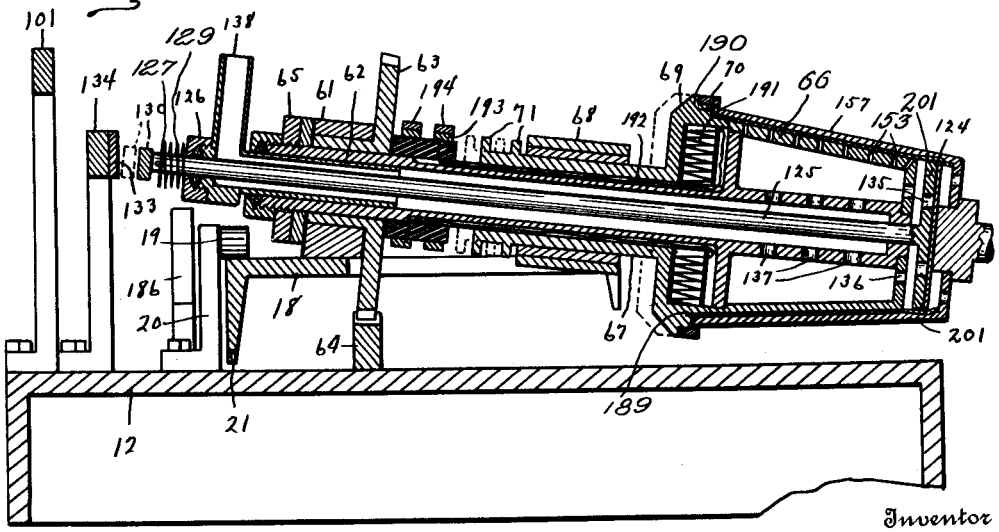

L. W. LUELLEN.
MACHINE FOR MAKING CONTAINERS.
APPLICATION FILED MAY 22, 1911.
1,193,574.
Patented Aug. 8, 1916.
12 SHEETS—SHEET 9.
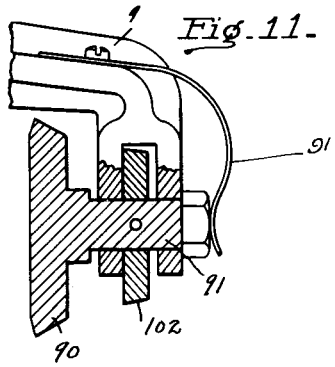
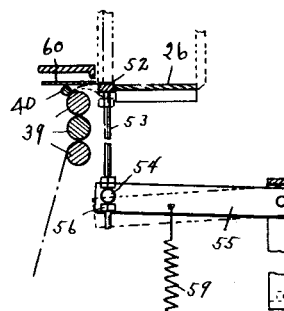
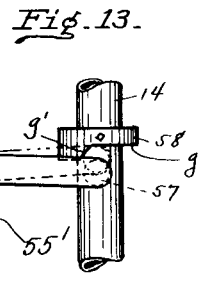
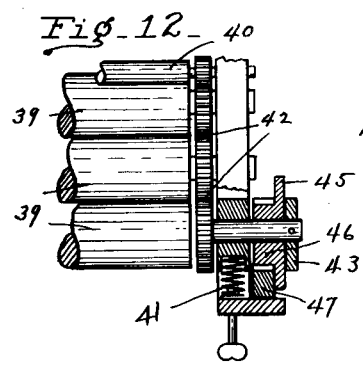
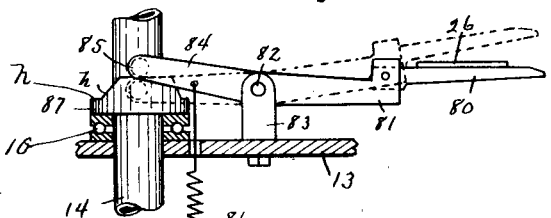
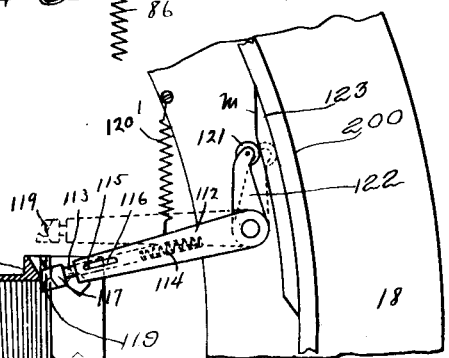
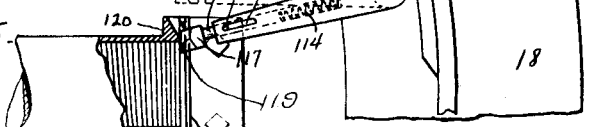
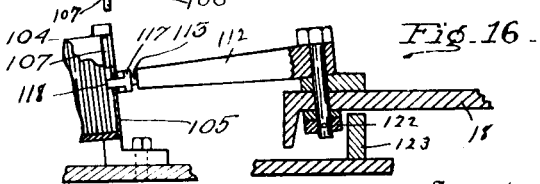
Witnesses
James E. Lynch
John Martin
Inventor
Lawrence W. Luellen
By Sylvanus H. Cobb
Attorney

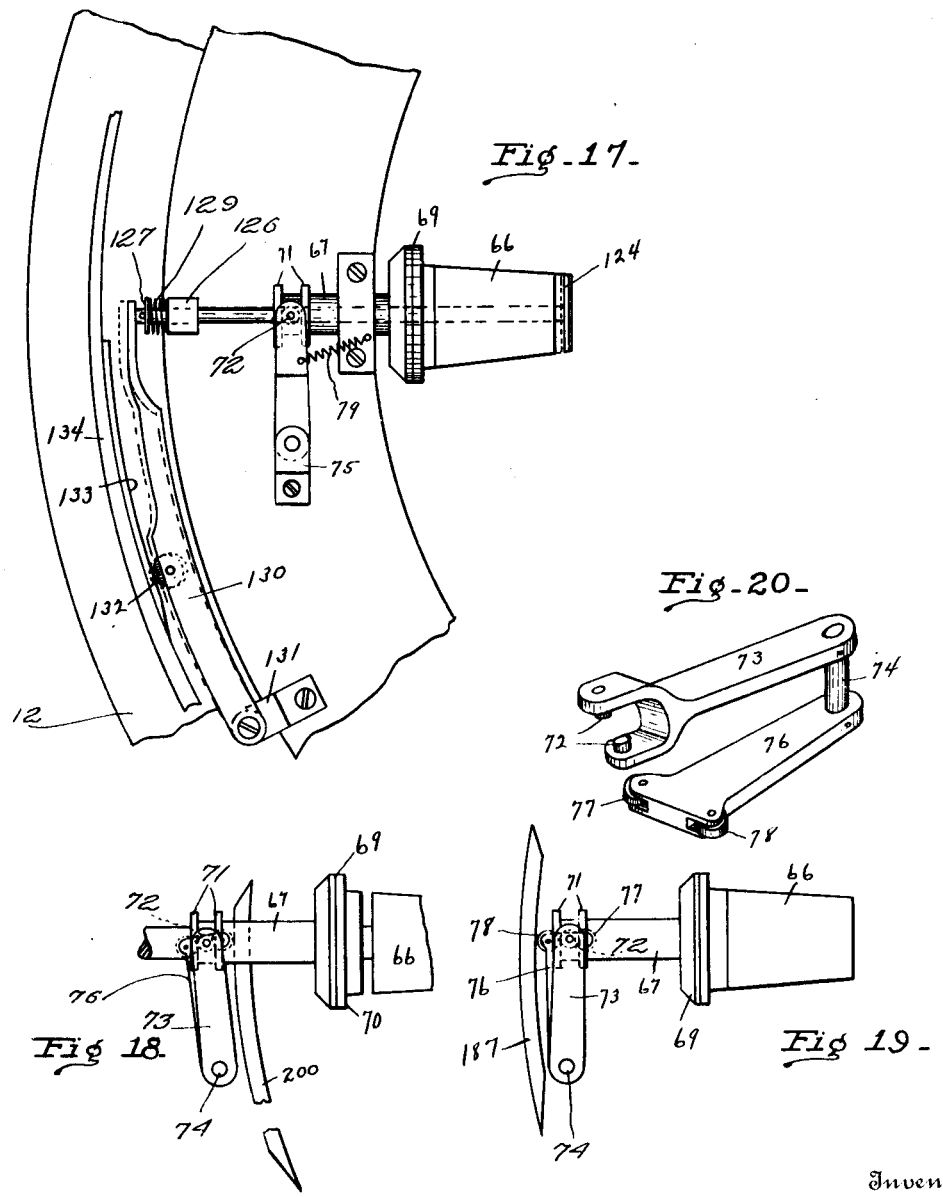

L. W. LUELLEN.
MACHINE FOR MAKING CONTAINERS.
APPLICATION FILED MAY 22, 1911.
1,193,574.
Patented Aug. 8, 1916.
12 SHEETS—SHEET 11.
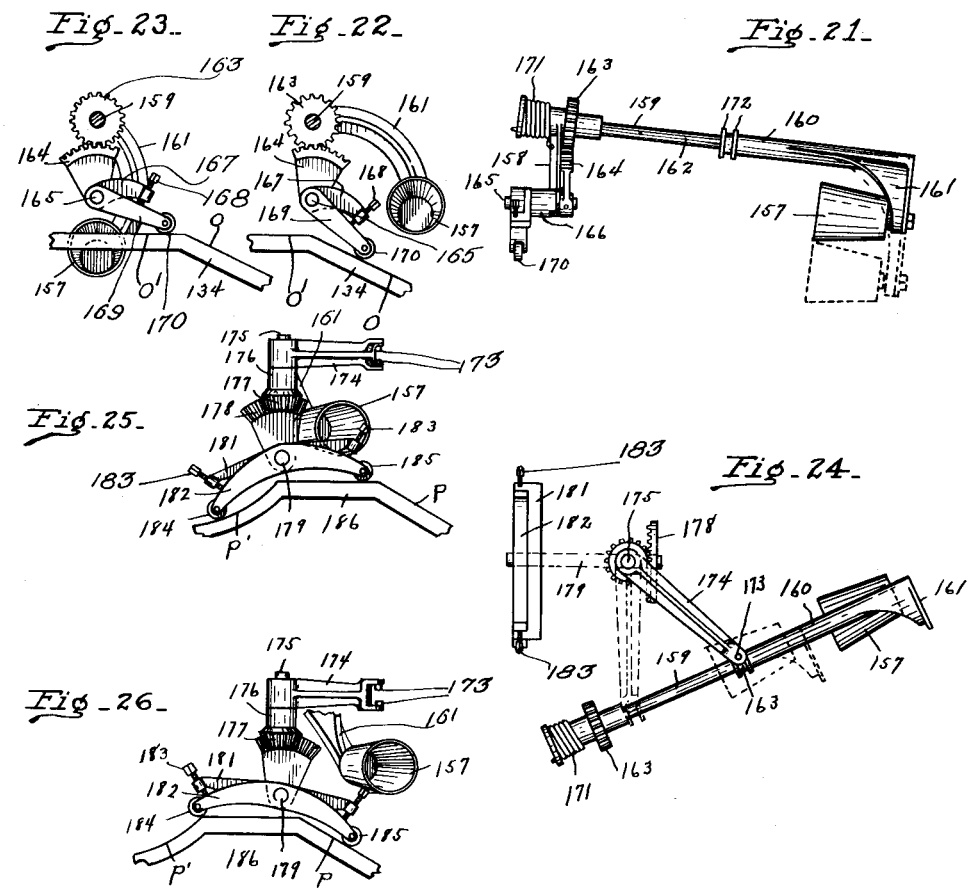
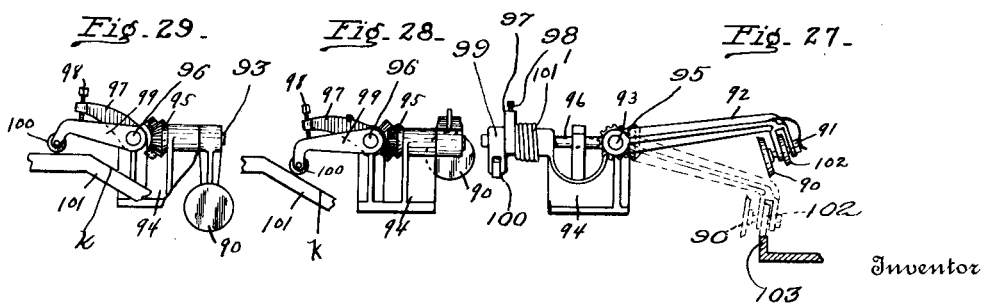
Witnesses
James E. Lynch.
John Martin.
Inventor
Lawrence W. Luellen
By
Attorney L. W. LUELLEN.
MACHINE FOR MAKING CONTAINERS.
APPLICATION FILED MAY 22, 1911.
1,193,574.
Patented Aug. 8, 1916.
12 SHEETS—SHEET 12.
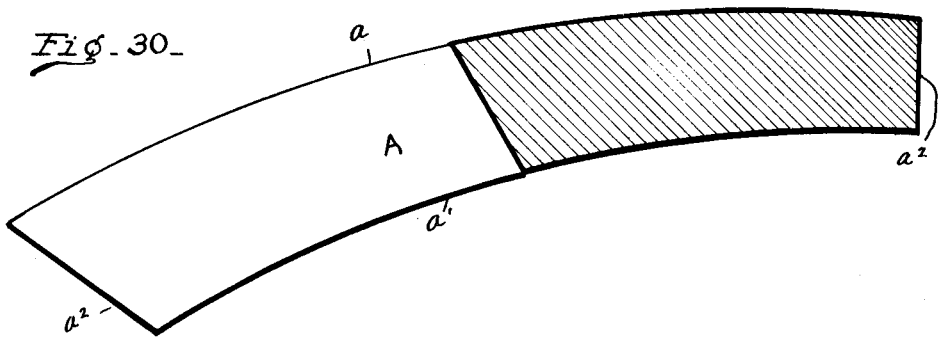
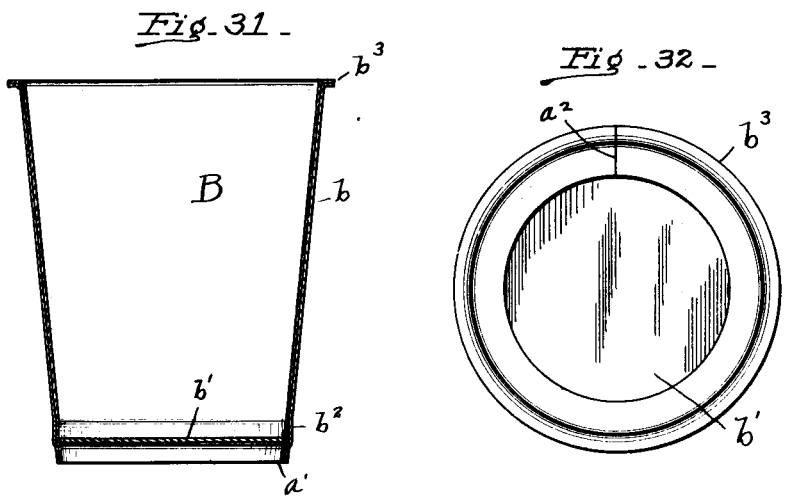
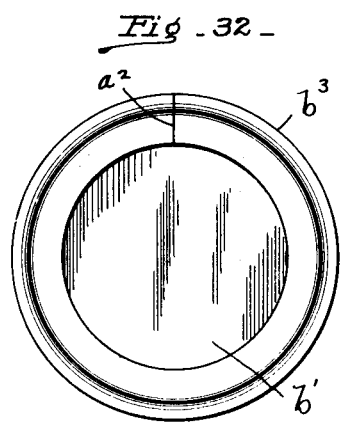
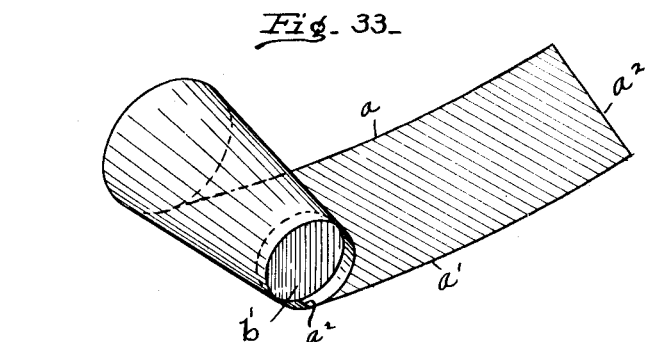
Witnesses
James E. Lynch.
John Martin
Inventor
Lawrence W. Luellen
By [signature]
Attorney

UNITED STATES PATENT OFFICE.

LAWRENCE W. LUELLEN, OF NEW YORK, N. Y., ASSIGNOR TO INDIVIDUAL DRINKING CUP COMPANY, OF NEW YORK, N. Y., A CORPORATION OF MAINE.

MACHINE FOR MAKING CONTAINERS.

1,193,574.  Specification of Letters Patent.  Patented Aug. 8, 1916.

Application filed May 22, 1911. Serial No. 628,850.

*To all whom it may concern:*

Be it known that I, LAWRENCE W. LUELLEN, a citizen of the United States, residing at New York, borough of Manhattan, in the county and State of New York, have invented a new and useful Machine for Making Containers, of which the following is a specification.

My invention relates to apparatus for making cups and other containers, especially vessels intended for the vending or dispensing of beverages and food. Its principal objects are to provide an effective automatic machine by which containers may be produced rapidly, inexpensively, and under rigid sanitary conditions.

The invention consists in the various features and combinations hereinafter described and more particularly set forth in the claims.

Figure 1:
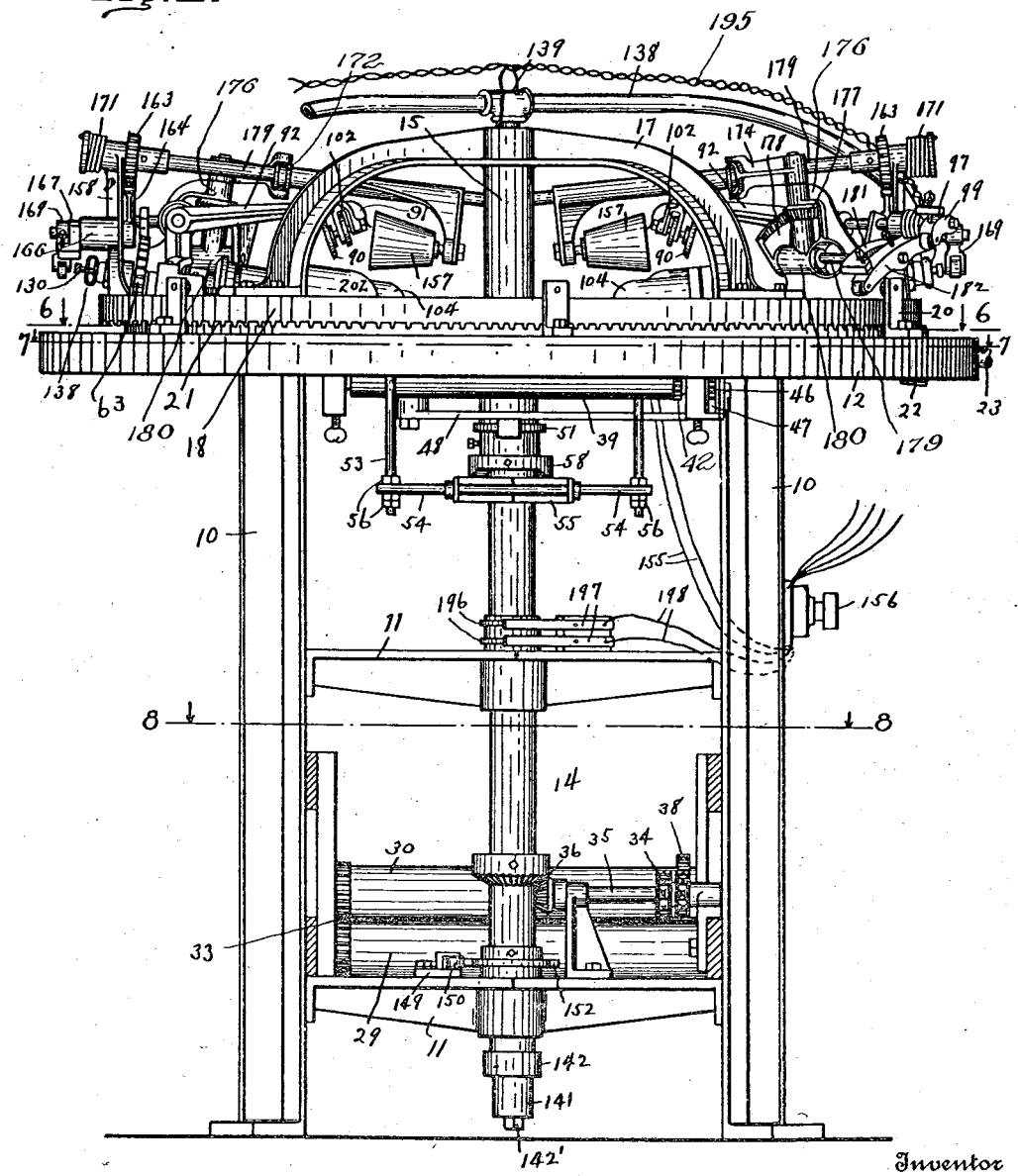
Figure 2:
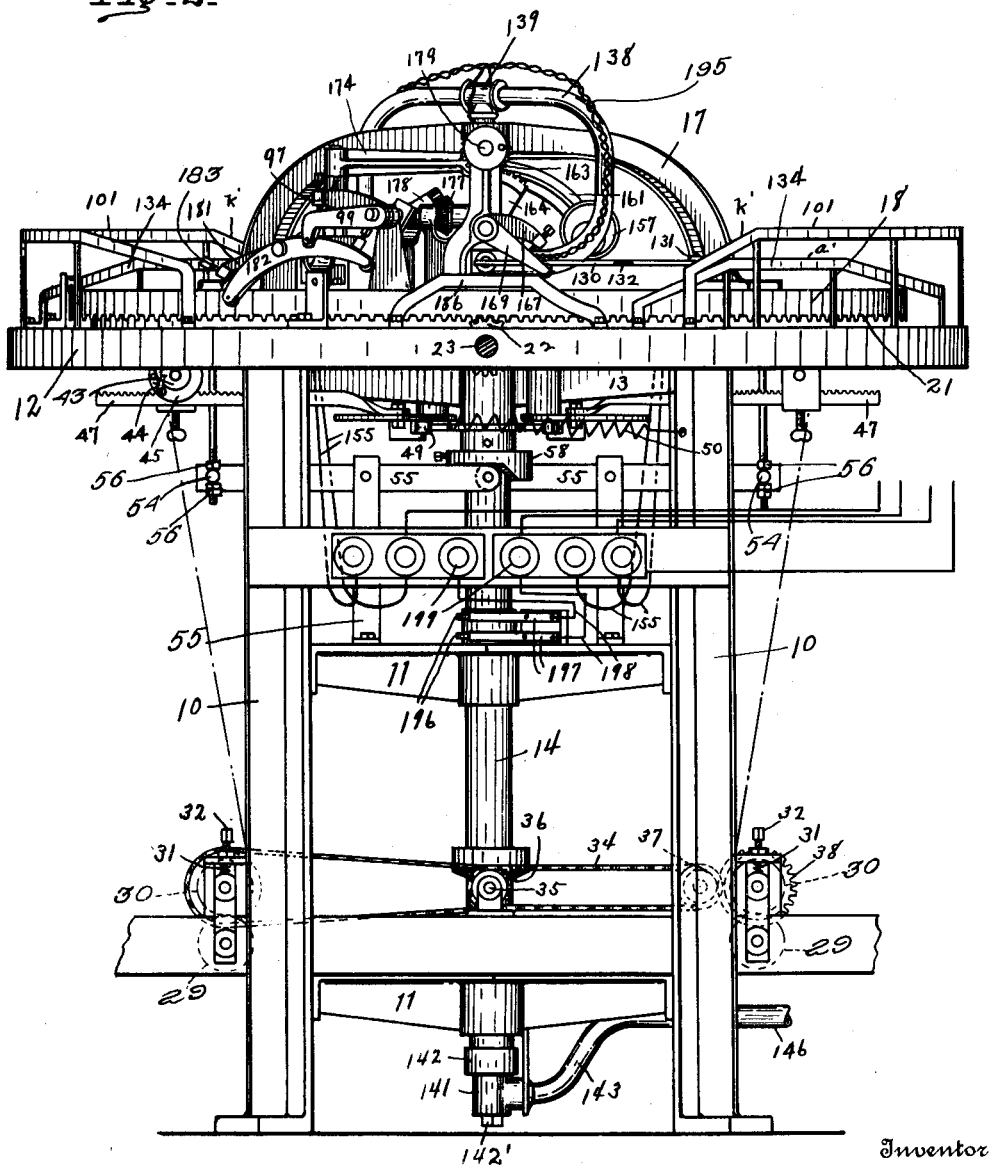
Figure 3:
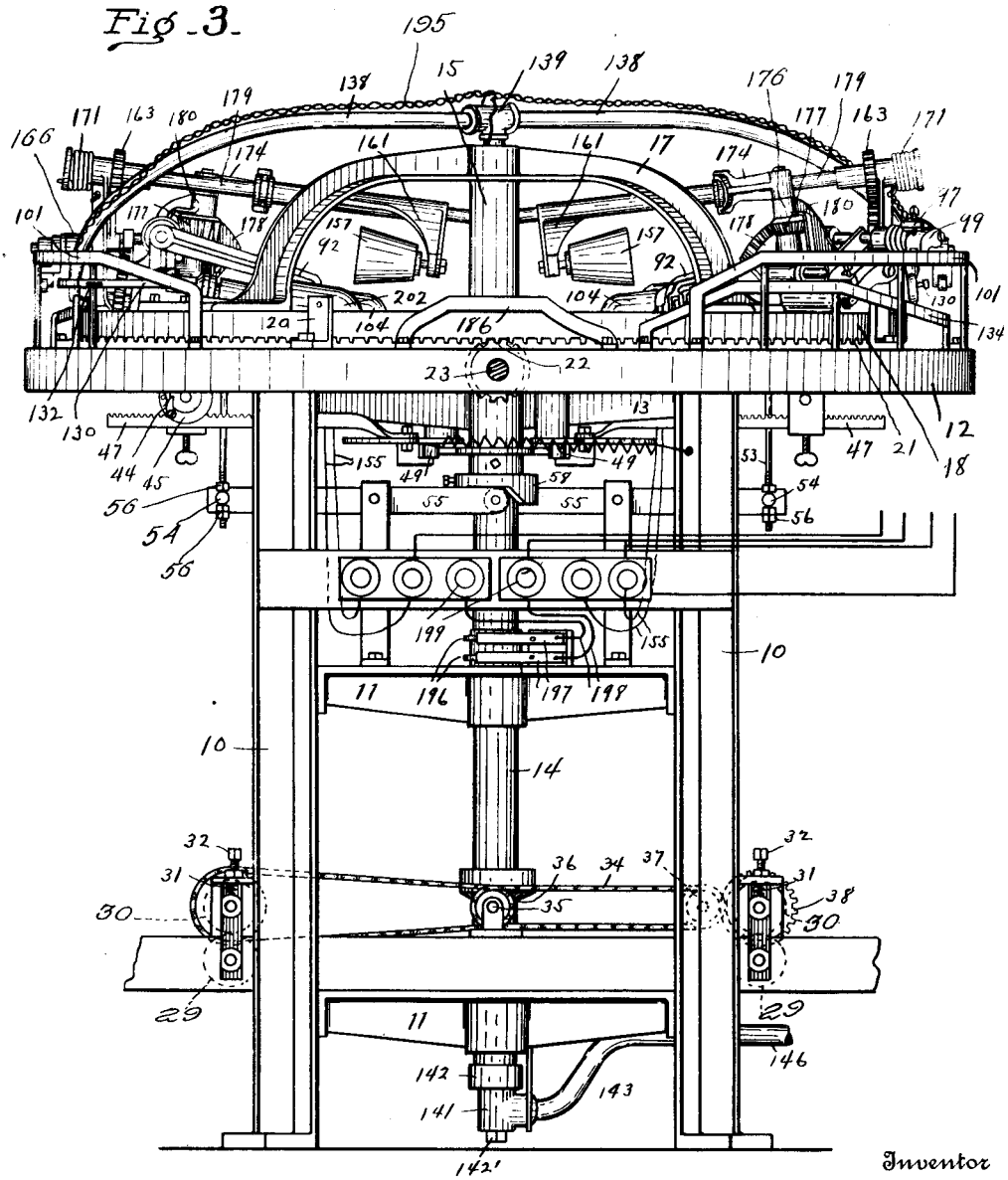
Figure 4:
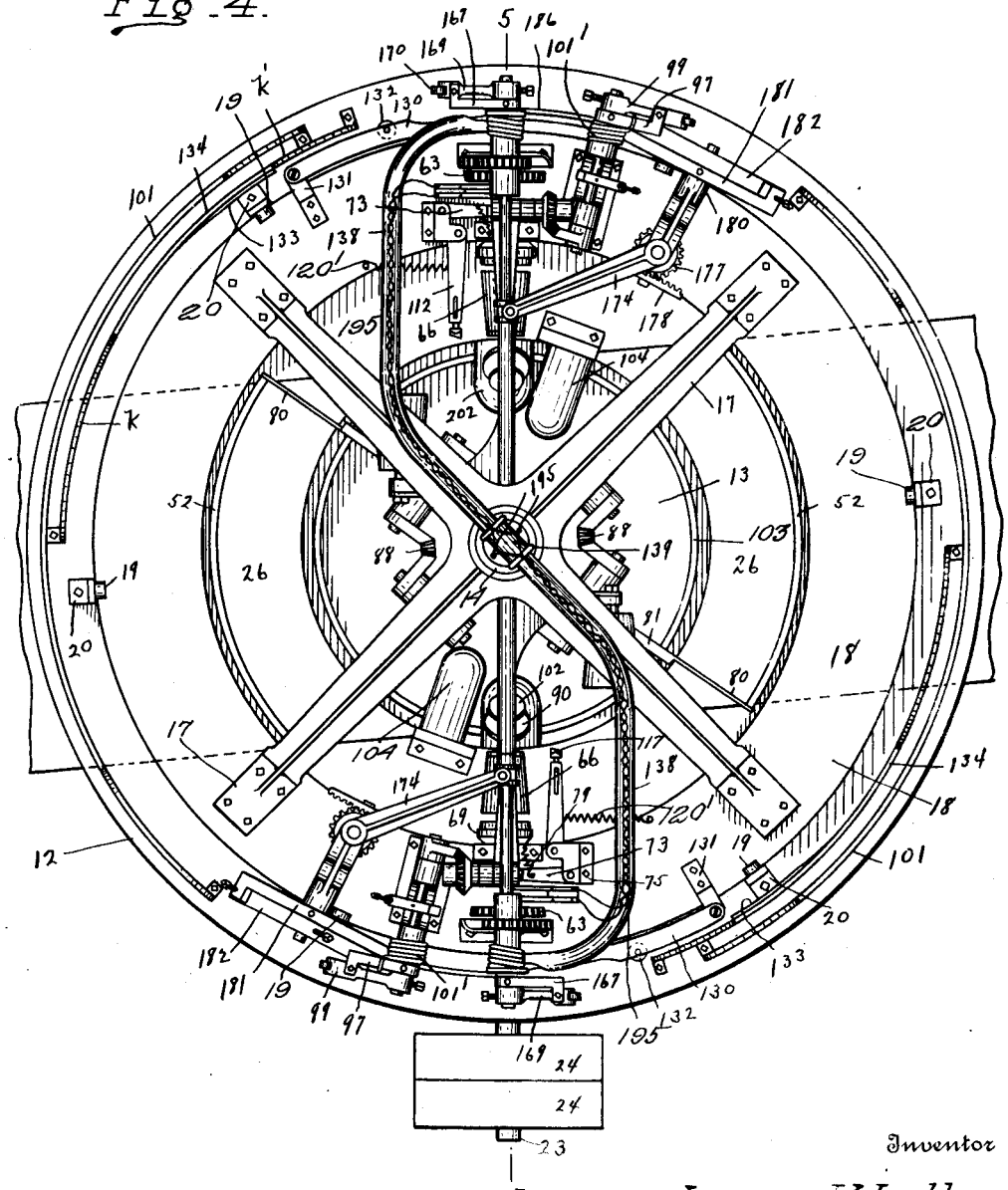
Figure 5:
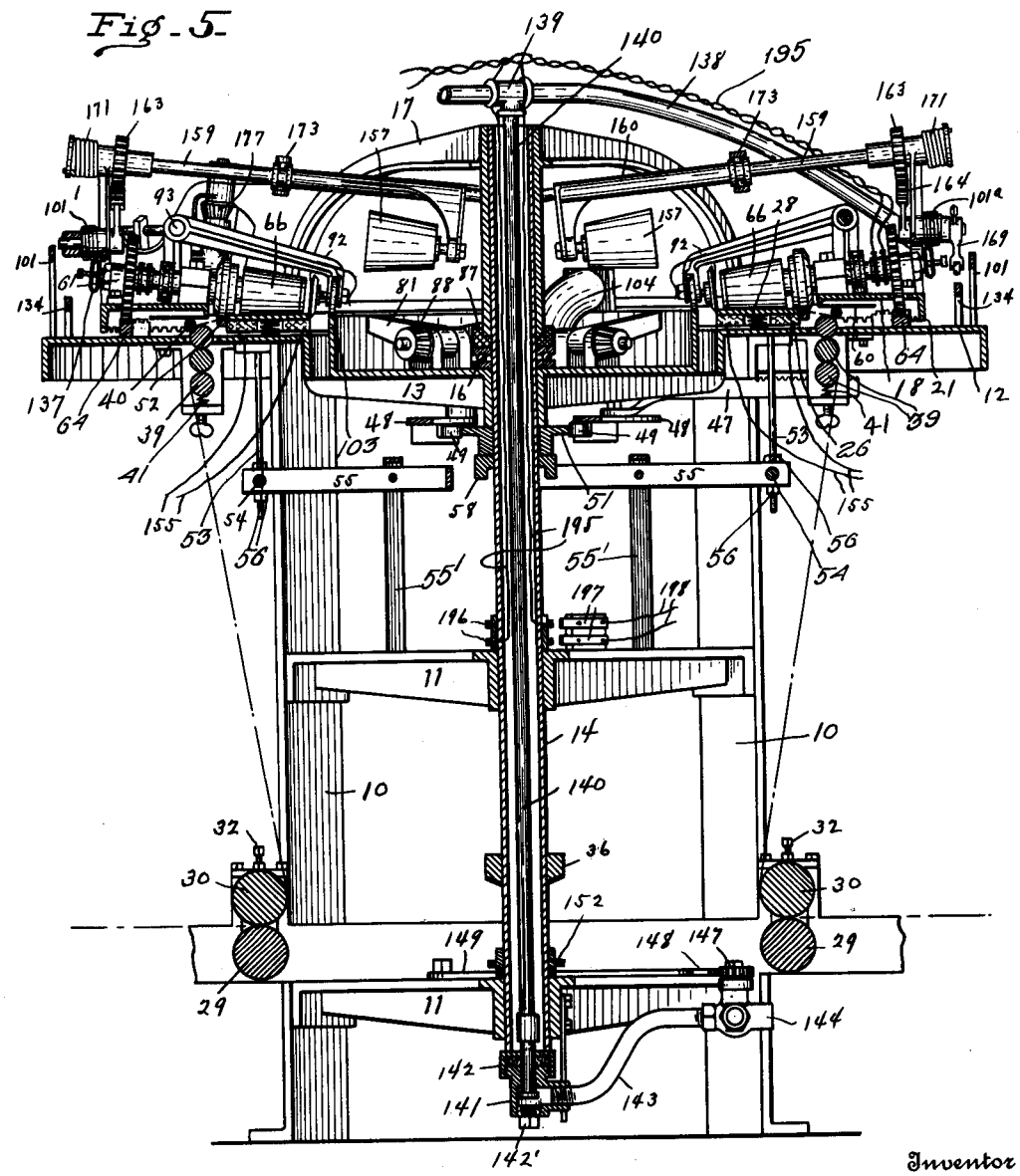
Figure 6:
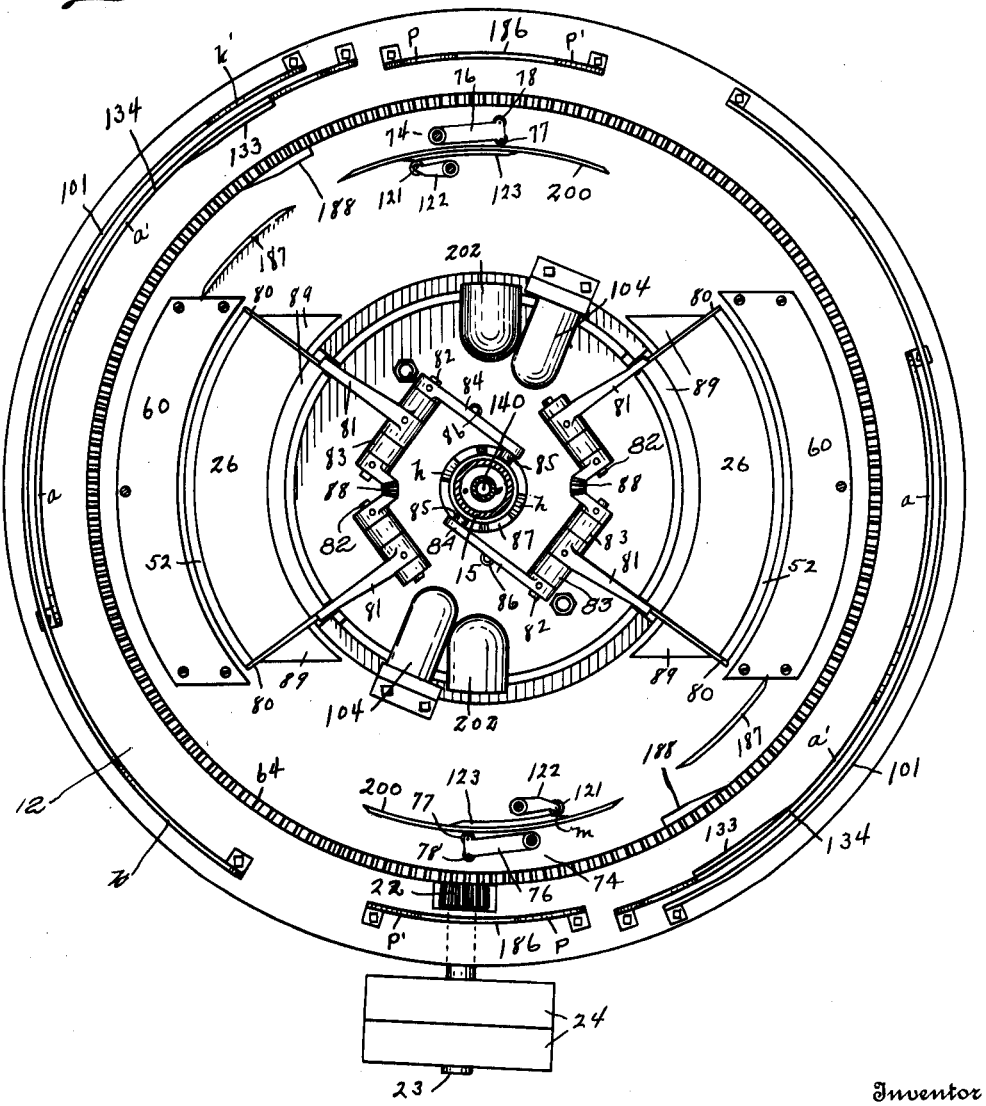

In the accompanying drawings, Figure 1 is a front elevation of one embodiment of my invention; Fig. 2 is a side elevation thereof, looking from the right in Fig. 1, with the operating parts in their normal or initial position; Fig. 3 is a similar view with the operating elements advanced and in action; Fig. 4 is a top plan view; Fig. 5 is a vertical section on the line 5—5 of Fig. 4; Figs. 6, 7 and 8 are horizontal sections on the lines 6—6, 7—7 and 8—8, respectively, of Fig. 1; Figs. 9 and 10 are vertical sectional details taken longitudinally through the axis of the traveling form, and showing the same with its coöperating parts in different positions; Fig. 11 is a sectional detail of the small rotary blanking knife; Fig. 12 is a fragmentary side elevation of the upper feed rolls; Fig. 13 is a sectional detail of the elevating segment, taken on the line 13—13 of Fig. 7; Fig. 14 shows in side elevation one of the end blanking or trimming knives; Fig. 15 is a detail in top plan of the bottom-supplying mechanism; Fig. 16 is a vertical sectional detail thereof; Fig. 17 illustrates as a top plan view the form with the means for actuating the bottom portion; Figs. 18 and 19 are details in top plan of the means for reciprocating the large rotary blanking knife or form-head; Fig. 20 is a perspective view of the lever employed for this purpose; Fig. 21 is a detail in side elevation of the mechanism for raising and lowering the outer form; Figs. 22 and 23 show successive positions of the same in end elevation; Fig. 24 is a top plan view of the mechanism for advancing and withdrawing the outer form; Figs. 25 and 26 are end elevations of this mechanism in successive operating positions; Fig. 27 shows in side elevation the means for raising and lowering the small blanking knife; Figs. 28 and 29 are end elevations of the same with the knife in its upper and lower positions, respectively; Fig. 30 illustrates a blank produced and operated upon by this machine; Figs. 31 and 32 show, respectively, a central vertical section and a top plan view of the cup or vessel produced; and Fig. 33 illustrates a partly formed container.

Similar characters designate like parts in all figures of the drawings.

That the operation of my improved machine may be more readily understood, it will be first stated that the cup or vessel to be made thereby is formed from a segmental blank A, particularly illustrated in Fig. 30 of the drawings, this blank having outer and inner circular edges $a$ and $a'$, respectively, and ends $a^2$, $a^2$, corresponding to radii of the circles. This blank when rolled into frusto-conical form furnishes a cup or container B, illustrated in Figs. 31 and 32, having a double side wall $b$, the ends $a^2$, $a^2$, coinciding with elements of the surface of the cone and the circular edges $a$, $a'$, occupying parallel planes at the top and bottom of the cup. The cup further has a circular bottom $b'$ seated in an annular depression $b^2$ situated a short distance above the lower edge $a'$, leaving a recess which permits the cups to nest accurately with one another, and to space with precision flanges $b^3$ extending outwardly from the upper edge of the cup at right angles to the axis.

The various elements of the machine are mounted upon a frame comprising posts or uprights 10 connected by spiders 11, 11, the arms of which are bolted to the uprights. Carried at the top of these uprights is a circular table 12 having a central depressed portion 13. Extending axially through the table and spiders, with bearings therein, is a tubular shaft 14 carrying fixed to its upper extremity a sleeve 15. Between the bottom of this sleeve and the table is a step-bearing 16 preferably including suitable anti-friction devices. Fast upon the top of the sleeve 15 is a spider 17 having curved depending arms, to the ends of which is secured a flat ring 18 moving above the surface of the table near its periphery. Guide rolls 19 are journaled upon brackets 20 mounted on the table, and project over and into contact with the outer edge of the ring, confining its movement to a true horizontal plane. Rotation is imparted to the ring, and through the spider to the sleeve 15 and shaft 14, by a circular rack 21 formed upon the underside of said ring, and with which meshes a pinion 22 secured to a horizontally extending main shaft 23 driven from suitable source of power by fast and loose pulleys 24. These driven parts of the machine carry the movable blank and container-producing elements, of which there are two sets, preferably precisely similar and each performing a complete operation during travel through 180° or less. Throughout the detailed description but one of these sets of elements will generally be described.

Considering then the first of the duplicate parts, supported upon the upper side of the table near the edge of the depression is a die or cutting and pressure block 26 of segmental form and extending circumferentially for about 90°. The upper face of this block provides an effective operating surface and square edges over which the outline of the blank is cut. As illustrated, the die-block is vertically movable, it being guided and limited in such movement by pairs of bolts 27, 27, as may be best seen in Fig. 9 of the drawings, passing into its underside and having heads contacting with the bottom of the table. The block is forced normally upward by springs 28 situated in suitable recesses and resting at their lower extremities upon the table. The cups are produced from a ribbon of material, which I prefer should be paraffin-paper, this coming from a convenient source of supply and passing between feed-rolls journaled in the frame near the lower portion. The bottom or bed-roll 29 may be held against vertical movement, while the upper or pressure-roll 30 is forced downward by springs 31 coöperating with its bearings, the tension of these springs being adjustable by bolts 32 threaded through the cap-plates. The feed-rolls 29, 30 are geared at 33 to rotate together, the upper roll being driven (Figs. 2 and 8) by sprocket-gearing 34 from a horizontal shaft 35 journaled in the frame and rotated by bevel-gearing 36 from the vertical shaft 14. To produce the correct direction of rotation, one of the pairs of rolls has an intermediate idle pinion 37 coöperating with a gear 38 upon its shaft. From the feed-rolls 29, 30, the ribbon travels upwardly to a set of multiple feed-rolls, of which four are shown (Figs. 5 and 12); three, each designated by the numeral 39, being journaled just below the table in a vertical series, while a smaller roll 40 lies just at one side of the upper roll 39. The last-named member, 40, may be fixed against bodily movement, while all the others are pressed yieldably toward it by springs 41. To secure an intermittent rotation of this upper set of feed-rolls, they are geared together at 42, and upon the spindle of the lower is fixed a collar 43 in which is a notch for engagement by a pawl 44 (Fig. 2). This pawl is pivoted upon the side of a disk 45, which is fixedly connected to a pinion 46 loose upon the roll shaft. With the pinion 46 meshes a rack 47 (Figs. 2, 7 and 12) mounted to slide in guides below the table, and having connected to it a lever 48 fulcrumed upon the frame, with a roll 49 drawn by a spring 50 into engagement with a cam 51 secured upon the shaft 14. This cam 51 has opposite circular portions $f$ and between these comparatively abrupt projections $f'$. While the roll is riding over the circular surface the rack is held in its innermost position and the set of feed rolls remain stationary, but when a projection reaches the roll the rack is urged rapidly forward, rotating all the upper feed-rolls through their connecting gearing and advancing the ribbon of paper, which passes between them alternately from opposite sides, toward the die block. As this occurs, said ribbon travels over a narrow supporting and elevating segment 52 carried just outside the block upon the upper ends of rods 53 (Figs. 1, 5 and 13), these passing through openings in a horizontal shaft 54 journaled in a tilting frame 55 (Fig. 7) pivoted upon standards 55' carried by the main frame. Nuts 56, 56 threaded upon the rods and contacting with opposite sides of the shaft 54 adjustably support the segment. At the opposite end of the frame from the shaft 54 is a roll 57 contacting with a cam 58 fast upon the shaft 14. Normally the segment 52 is maintained below the level of the die-block by a spring 59, which draws the roll 57 against a horizontal face $g$ of the cam, but when a depending projection $g'$ of the cam reaches the roll, the frame 55 is tilted and the segment raised, this occurring just as the forward end of the advanced ribbon of material is above it, and directs it with certainty over the face of the block. A guide-plate 60, extending horizontally above the feed-roll 40 to the segment 52, limits the upward movement of the ribbon.

The edges of the ribbon as its reaches the die-block are parallel, and therefore not correctly positioned to furnish the ends of a blank from which a symmetrical tapered vessel is to be formed. To bring them to the proper radial lines, as illustrated in Fig.

30, I provide for coöperation with cutting angular ends upon the block, knives 80, 80. Each of these knives (Figs. 6 and 14) is fixed upon a lever 81 secured to a short shaft 82 rotatable in bearings 83 carried by the depressed portion of the table. At one end of one of each pair of shafts 82 is secured an arm 84, having a roll or projection 85 drawn by a spring 86 against the surface of a cam 87 rotatable with the shaft 14. At the opposite extremity of the shaft from the arm is a segmental bevel gear 88 meshing with a like gear upon the shaft of the companion knife, causing them to rise and fall together. The form of the cam 87 is such that the knives normally stand above the die under the influence of a horizontal portion $h$, and are lowered abruptly by a projection $h'$ and then returned to their initial position. The severed portions of the blanks may be allowed to fall through triangular openings 89 in the table.

Rising from the upper face of the rotary ring 18 is a bearing 61 (Figs. 5, 9 and 10), in which is journaled a tubular shaft 62 carrying a gear 63 meshing with a circular rack 64 fixed to the table below the ring. The shaft may be held against longitudinal movement in one direction by the contact of the gear with the bearing, and from movement in the other direction by a nut threaded upon the end of the shaft 62 and coöperating with the opposite side of the bearing, there being preferably the usual interposed washer. At the inner end of shaft 62 is a frusto-conical form 66, adapted to have wound about it the paper blank A to furnish the side wall of the cup B. This form, advanced over the die-block by the travel of the ring, is held in close contact therewith over longitudinal elements of its periphery by the upward pressure of the springs 28, and at the same time is rotated about its axis by the engagement of the gear 63 and rack 64. Surrounding the central portion of the shaft 62 is a sleeve 67, having about it a bearing 68 carried by the ring. This sleeve, at its inner end, has an enlargement furnishing a head 69 for the body-portion 66 of the form, upon which is mounted an annular knife 70 for coöperation with the outer edge of the die-block, or that having the larger radius. At the opposite extremity of the sleeve from the head is a groove formed between flanges 71, this groove receiving opposed pins 72, 72 fixed in a yoke upon the end of an arm 73 (Figs. 18 and 19). This arm is fast upon the upper end of a spindle 74 oscillating in a bearing 75 upon the ring, and having at its lower end an arm 76 (Fig. 20) provided with a broadened portion upon which rotate rolls 77 and 78, the purpose of which will be hereinafter stated. A spring 79 normally forces the knife 70 into close shearing contact with the edge of the block 26. With the opposite or inner edge of the block coöperates a circular knife 90 (Figs. 9, 11, 27, 28 and 29) of less diameter than that upon the head 69, this being fixed to a spindle 91 rotatable in an arm 92, which arm is secured to a short shaft 93 journaled in a bracket 94 rising from the ring. Bevel-gearing 95 connects the shaft 93 with a second short shaft 96, rotatable in the same bracket 94 and having an arm 97 fixedly attached to it. In the outer extremity of the arm 97 is shown a screw 98, which engages the upper side of a second arm 99 loose upon the shaft 96. A roll 100 upon an angular portion of this arm 99 contacts with a curved cam-bar 101 carried near the outer edge of the knife table. In the normal position of the knife 90 and its actuating elements, it is held by a spring 101' at its highest point, as is illustrated in full lines in Fig. 27 of the drawings; but when the roll 100 contacts with an upwardly inclined portion $k$ of the cam-bar 101, the knife is lowered until the edge of a disk 102 secured to the spindle 91 rests upon the edge of a track 103 carried by the depressed portion 13 of the table. This guides the knife at the correct height for perfect cutting contact with the associated edge of the die-block, it being allowed to adjust itself thereto by a limited longitudinal play of the shaft 91 in its bearings, against the tension of a spring 91'. It will be evident that the plural arms 97 and 99, with the intermediate screw, permit the vertical travel of the knife 90 to be very exactly adjusted. This lowering of the knife 90 and its cutting of the edge of the blank of smaller radius preferably takes place simultaneously with the action of the knife 70 upon the edge of larger radius.

Before the form reaches the block 26, and therefore before the rotary knives come into action, said form passes the upper end of a receiver for the bottoms of the cups. These bottoms are preferably circles of comparatively thin card-board, and the receiver conveniently takes the form of a tube 104 (Figs. 4, 15 and 16) extending upwardly through the frame and through the portion 13 of the table to a point adjacent to the forward end of the block, said tube being curved so that its outlet is here horizontal. This outlet is closed by a plate 105 in which is a horizontal slot 106, the side of the tube having just at the inner face of the plate and toward the block a vertical slot 107 through which the bottoms may be successively forced. The entire series of bottoms is pressed toward the plate by some suitable means exerting a constant pressure upon the contents of the receiver, as a source of air-pressure connected to the lower extremity of the tube 104. To avoid confusion in the drawings, this tube is not shown in its full length. Pivoted upon the inner portion of the upper surface of the ring 18 is a lever, one arm 112 of which has a longitudinally extending bore to receive a sliding finger 113 urged outward by the spiral spring 114, situated at the bottom of the bore and limited in its movement by a pin 115 projecting into a slot 116 in the arm. The finger 113 carries a tip or head 117 provided with a reduced portion 118 of the proper thickness to enter the horizontal slot 106. At the outer face of the tip, at each side of the reduced portion, are inclined surfaces meeting at a point 119. About the entering extremity of the slot 106 is a guide member 120 having a throat with surfaces leading to the end of the slot. The points 119 of the head first engage these throat surfaces and direct the reduced portion 118 to the slot. Thereafter the points slide over the face of the plate 105, holding said portion 118 in the proper position to contact with a single head of the supply in the tube 104 and, in the advance of the ring 18 and lever 112, thrust it through the opening 107. During the greater portion of the travel of the ring the arm 112 is held back from the plane in which the plate 106 lies by a spring 120', but before the form reaches the tube 104, a roll 121 upon an arm 122 of the lever rides up an incline m upon a cam projection 123 from a cam-rib 200, later described, causing the lever to be swung forward into a position in which the tip 117 will engage the guide member.

At the end of the form 66 is a movable bottom-portion or plunger 124 (Figs. 9, 10 and 17) having the same diameter as the body-portion, said plunger being carried by a rod 125 extending axially of the shaft 62, passing through a stuffing box 126 to prevent the ingress or egress of air. Between the outer end of the shaft and an enlargement upon the rod furnished, for example, by a washer 127 abutting against a pin 128, is a spiral spring 129, normally maintaining the plunger in contact with the end of the form 66. Against the extremity of the rod, beyond the spring, rests a lever 130 fulcrumed upon a bracket 131 secured to the ring. Between the fulcrum and the point of contact with the rod a roll 132 is mounted upon the lever, and in the rotation of the ring runs over a cam-projection 133 from the inner side of a cam-bar 134 extending about a portion of the table near its periphery. The effect of the coöperation between the roll 132 and projection 133 will be hereinafter stated. In the plunger 124 are openings 135 which communicate with openings 136 in the end of the form 66. Within the form, through the shaft 62, are a plurality of series of openings 137. From the opposite or outer end of the bore through the shaft into which the openings 137 lead is a tube 138, which may be flexible, and which connects to one side of a T-fitting 139 threaded upon the top of an axial pipe 140 passing through the shaft 14 (Fig. 5). At the bottom of the machine the pipe 140 communicates with a head 141, which it enters through a stuffing box 142. A cleaning opening may be provided in the bottom of the box, this opening being closed by a screw plug 142'. From the side of the head (Fig. 8) leads a pipe 143 in which is a three-way cock 144, controlling an exhaust maintained through a pipe 145 and air-pressure admitted through an opposite pipe 146. Upon the stem of the valve is a pinion 147, with which meshes a segmental gear 148 upon an arm 149 fulcrumed upon one of the frame-spiders. A roll 150 carried by this arm is drawn by a spring 151 into contact with a cam 152 fast upon the shaft 14. The cam 152 has two opposite circular surfaces n, n of considerable extent, and between these two abrupt projections n', n'. When the roll 150 rests upon said surfaces n the exhaust-pipe 145 is connected with the vertical pipe 140, and therefore with the interior of the form. The suction, exerted through the openings 136 and 135, draws against the plunger 124 the cup-bottom which has been pushed out of the receiver 104 by the finger-tip 118, and there holds it for the succeeding operations.

The side wall of the form 66 has a series of openings 153 situated along an element of the surface, transversely of the block 26. These openings have such a predetermined angular relation to the block, through the coöperation of the pinion 63 and rack 64, that they contact with the severed paper thereon just at the forward end of said block, the suction drawing the paper against the form and holding it there during the travel. Situated in suitable compartments in the block are heating coils 154 from which conductors 155 lead to fuse-plugs or cutouts 156 mounted upon the main frame. These coils heat the block to such a degree that the paraffin upon the paper resting thereon is softened. As the paper is wound about the form and the second layer thereof comes in contact with the first, the pressure between the spring-pressed block and form forces the layers against one another and causes the paraffin, which sets upon rising out of contact with the heated surface, to bind the parts firmly together. It may also be noted that this spring contact between the block and form puts a certain tension upon the blank being wound about it, resulting in its smooth disposition over the form.

The bottom of the cup is now to be forced to its final position and a flange formed about the upper edge of the side wall. In preparation for this, an outer or female form 157 (Fig. 10) is brought over the winding form 66 and into close contact with the paper thereon. Extending from a point near the upper extremity of the shaft 14 and sleeve 15 to a bracket 158 (Fig. 1) is a rotatable spindle 159 about which is a sleeve 160 (Figs. 21 and 24). This sleeve has projecting from its inner end a curved arm 161, and upon the arm is swiveled the form 157. The spindle 159 and sleeve 160 are splined to one another at 162, so that while they rotate together, the sleeve and form 157 may be moved over the spindle toward and from the winding form 66. Fast upon the spindle 159 is a pinion 163 (Figs. 22 and 23) which coöperates with a segmental gear 164 secured to a shaft 165 journaled in a bearing 166 on the ring 18. The shaft carries a fast arm 167 with its adjusting screw 168 contacting with loose arm 169, in the manner previously described in connection with the movement of the small rotary knife 90. A roll 170 at the lower end of the arm 169 coöperates with the upper edge of the cam-bar 134 attached to the outer portion of the table, into engagement with which it is drawn by a spring 171. The sleeve 160 has a groove furnished by adjacent flanges 172 adapted to receive opposite projections 173 from an arm 174 (Figs. 24, 25 and 26), the short vertical shaft 175 of which is journaled in a bearing 176 carried by the ring 18. A beveled pinion 177 upon the lower end of the shaft coöperates with a segmental gear 178 fixed to a horizontal shaft 179 rotatable in a bearing 180 (Figs. 1 and 3). This shaft has the arrangement of fast arm 181 and loose arm 182, but in this case both arms are double, there being two adjusting screws 183 and two rolls 184 and 185, the latter being upon the ends of the double arm 182 and coöperating during a limited period of its travel with the upper edge of a cam 186 fixed to the table. When the roll 170 travels by an initial incline o of the bar 134, it raises the arm 169 and lowers the outer form from its raised position, where it clears other elements, into the horizontal plane in which lies the winding form, this position being reached and maintained as said roll is moved over a horizontal surface o' of the bar 134. Then when the roll 184 upon the arm 182 reaches an initial incline p of cam 186, the movement imparted through the gearing to the arm 174 slides the sleeve 160 along the shaft 159 and brings the outer form over the winding form 66, pressing it against the paper thereon. This continues until the roll 184 begins to travel down the opposite incline p' of the cam 186, when operations to be now described having occurred, the outer form is withdrawn. It should be observed that as the roll 184 descends, the opposite roll 185 rides up the incline p of the cam, both being in contact at the same time and thus imparting to the form a positive movement of withdrawal.

As the rotary knives 70 and 90 complete the cutting of the curved edges of the blank, the arm 92 is lifted by its spring, this being allowed by the descent of the roll 100 over the final incline k' of the cam 101 (Fig. 6). This occurs at such a time that the knife is freed from the die just as it leaves the farther end, preventing the knife from snapping over the corner with a possibility of breaking the edge. Injury to the knife 70 is similarly guarded against by the contact of its roll 77 with the outer edge of a cam rib 187, which abruptly shifts the arms 76 and 73 and moves the head 69 away from the die just as the cut is completed. The other roll 78 upon the arm 76 immediately thereafter comes into contact with a cam projection 188 from the inner surface of the annular rack 64. This shifts the head 69 in the opposite direction, causing a curved annular corner 189 at the inner side of the head to strike the circular edge at the top of the cup-wall as it is held between the winding and outer forms. The travel of the head continuing, the edge of the cup is directed over a surface 190, into which the curved corner merges and which lies at right angles to the axis of the form; between this surface and the flat outer edge of the form 157 the cup-edge is firmly pressed. In recesses in the head are located heating coils 191 joined by conductors 192, lying in grooves between the shaft 62 and sleeve 67, to collector-rings 193 mounted upon but insulated from the shaft 62 and from one another. Brushes 194 bear upon the collector-rings, and from these brushes conductors 195 lead through the tubular shaft 14 to collector-rings 196 mounted upon and insulated from said shaft. To these rings current is supplied by brushes 197 and conductors 198 connected through cutouts 199 with a source of electrical energy. The head, heated by the coils 191, softens the paraffin in the flange, then when the head is withdrawn by the contact of roll 77 of arm 76 with a cam-rib 200 on the table (Figs. 6 and 18), the setting of the paraffin renders permanent the position of the cup-flange at right angles to the axis. While this flanging operation is going on the roll 132, controlling the movement of the plunger 124, has ridden upon and is traveling over the cam-projection 133 (Fig. 17). The plunger is thereby forced inwardly carrying the cup-bottom before it, and on account of the taper of the side wall of the cup, the bottom produces a depression which is permitted by an annular groove 201 about the interior of the form 157 (Fig. 10). The bottom is therefore now tightly seated in an annular depression in the cup-wall which it has itself produced. This having been accomplished, the roll 132 rides off the cam-projection 133, and the plunger is restored to its original position. The cup is now completed, and has arrived opposite an opening in a conduit 202 (Figs. 1, 3 and 6) leading downwardly through the table to a receptacle (not illustrated) in which the cups are to be deposited, nested one within another. Just at this time, projection $n'$ upon the cam 152 operates the cock 144 to connect the pipe and the interior of the form 66 with the air-pressure. This acting through the openings 136 and 135 blows the cup from the form into the conduit, through which it falls to the receptacle.

To briefly summarize the operation of the specific machine which I have described in detail, it may be said that a ribbon of paraffin-paper is drawn from a supply-roll by the lower feed-rolls 29, 30, and, with the aid of the elevating segment 52, presented accurately and in smooth condition by the feed rolls 39, 40 to the die-block 26. When the end of the ribbon reaches the block, the first step in the production of the cup-blank A is automatically performed by the pair of reciprocatory knives 80, 80, in coöperation with the square ends of the block, these changing the parallel edges of the ribbon to the inclined or radial ends $a^2$ of the blank. Now the winding form 66, in its continuous travel about the table, passes the receptacle 104, and, by means of the arm 112 moving with it, removes therefrom a cup bottom $b'$ which is drawn to and held against the plunger-head 124 by the suction exerted through its openings. Thus supplied, and with the rotary knife 90 lowered into place beyond the bottom, the form reached the die-block. Upon the beginning of the cutting of the circular edges $a'$, $a$ over the sides of the block by the knife 90 and the larger knife carried by the head 69, the row of suction-openings 153 in the form, which extends transversely of the block, is brought into registration with the end of the blank, causing it to be held firmly against the form, which as it revolves over the block also rotates about its axis. Therefore, as the circular edges of the blank are severed, it is gradually wound about the form and the bottom $b'$ and pressed between said form and the block. Since the latter is heated by its coils, the paraffin of the blank is softened, and after one layer of the cup-wall has been wound upon the form, the second is cemented to it by the partly fluid paraffin, which begins to set as soon as the wall is raised from the warm surface by the rotation of the form. When the opposite extremity of the block is reached, both the cutting and winding have been completed and the knife 90 is removed from alinement with the form 66 and the outer form 157 is automatically brought into position opposite the bottom portion of said form 66 and then over it, exerting a uniform pressure about the cup-wall. It also fixes the position of the wall while the bottom $b'$ is seated in the groove $b^2$ by an outward thrust of the plunger; and its end surface acts as a die coöperating with the heated head 69 to produce the cut flange $b^3$, the movement of the plunger-head 124 and the cutting and flanging head 69 occurring automatically after the pressure-form has been brought into contact with the cup-wall. There now remains only the restoration of the heads to their normal position and the application of an air-blast to the openings through which the suction has been maintained. This frees the cup and delivers it, complete, to the conduit 202. The winding form and its associated traveling cup-producing elements thereupon pass on to the duplicate set of relatively stationary elements, while the companion form coöperates with the stationary parts which have just been utilized. The efficiency of such a machine will be obvious, the cups being manufactured speedily and the machine requiring little attention. The condition under which the machine produces vessels intended to contain food or beverages should also be noted. From the time the roll of paper is started through the machine until the vessels are complete and nested in their final package, no operator need touch them, and their manufacture may be absolutely hygienic.

I claim as my invention:

1. In a machine for making containers the combination with a relatively horizontal revoluble tapered form of means including blanking and bottom supplying instrumentalities coöperating with the form to complete a plurality of cups during each revolution of the form.

2. In a machine for making containers, the combination with a continuously revoluble form, of relatively stationary container-producing means having an extended surface over which the form travels and container-producing means traveling with the form and coöperating therewith and being movable longitudinally of its axis.

3. In a machine for making containers the combination with a relatively horizontal revoluble tapered form of means including blanking and bottom supplying instrumentalities coöperating with the form to complete a plurality of cups, during each revolution of the form and discharging means acting upon the cups for discharging them from the form when completed.

4. A machine for making containers comprising a revoluble form and cutting mechanism actuated by the rotation of the form to sever the material into a blank, said blank being acted upon by the form to produce a container.

5. A machine for making containers comprising a traveling form blanking means including cutting instrumentalities coöperating with the form and means for bringing the form, blanking and cutting instrumentalities into coöperative relation and means coöperating with the form for producing a container, said latter means including bottom supplying means.

6. In a container-making machine, the combination with a table, of a pressure-block movably mounted thereon, a form traveling over the pressure-block, means for feeding material between the block and form, and springs situated between the table and block to force said block against the form, whereby tension is exerted upon the material.

7. In a container-making machine, the combination with a table, of a pressure-block movably mounted thereon, members passing from the block and having heads engaging the underside of the table, a form traveling above the pressure-block, and springs situated between the table and block.

8. A machine for making containers comprising a form, means for imparting a movement of translation to the form, a relatively stationary block having an extended surface over which the form travels, means for feeding material across the extended surface of the block, and heating means for the form and block.

9. A machine for making a double roll paper cup from a single blank of material provided with a coating of fusible cement, having in combination a traveling form, a relatively stationary recessed block, cutting instrumentalities coöperating with the form and block to cut the blank of material and electrical heating means within the recess of the block for fusing the cement so that the double walls of the container will be cemented together.

10. The combination with a die, of a form, and a head for the form coöperating with the die as a cutting member and coöperating with the form as a pressure member.

11. The combination with a die, of a form, a head for the form coöperating with the die as a cutting member and coöperating with the form as a pressure member, and means for moving the head longitudinally of the form.

12. The combination with a die, of a form, a head normally coöperating with the die as a cutting member, and means for moving the head into coöperation with the form to act as a pressure member.

13. The combination with a pressure-block, of means for feeding material across the block, a form arranged to roll upon the block and being provided with an opening, suction means connected with the opening to lift the material from the block, and means for heating the block and form during the feed and travel of material.

14. In a machine for making containers, a die, a form, a cutting and pressure element, said element coöperating in its cutting action with the die and exerting pressure against the form.

15. In a machine for making containers, a form including a body-portion and a head provided with cutting means and being movable toward and from the body-portion.

16. A movable form having a cup-shaped body-portion adapted to hold a container in its interior, and a head movable with the form provided with a flange-producing surface coöperating with the edge of the body portion surrounding its open end, the body and head being relatively movable toward and from one another.

17. In a machine for making paper cups from a single blank of paraffined paper a form including a body portion upon which the said blank is adapted to be wound so that the blank of paper will overlap to form a double wall for the cup and a reciprocating head adapted to operate with the body portion to form a flange on the cup and means for heating the head so as to fuse the paraffin so that the plies of paper will adhere together to form a unitary flange on the cup.

18. In a machine for making containers, the combination with a relatively horizontal revoluble tapered form of a stationary blanking block, said tapered form and blanking block having coöperating cutting edges.

19. In a machine for making containers, the combination with a stationary blanking block, of a traveling form horizontally revoluble relatively thereto, said block and form having coöperating cutting edges and means for moving the cutting edges toward and from one another transversely to the direction of travel.

20. In a machine for making containers, a die, a form traveling thereover, a rotatable knife coöperating with the die at the end of the form, and automatic means for moving the knife toward and from the form.

21. In a machine for making containers, a die, a form traveling thereover, a rotatable knife coöperating with the die at the end of the form, and automatic means for moving the knife to one side of the form.

22. In a machine for making containers, a block, a form traveling thereover, a rotatable knife coöperating with the block at the end of the form, means for moving the knife toward and from the form, and a fixed guide for the knife.

23. In a machine for making containers, a block, a form traveling thereover, a rotatable knife coöperating with the block at the end of the form, means for moving the knife to one side of the form, and a track for guiding the knife when it is in coöperation with the block.

24. In a machine for making containers, a die-block, a form traveling thereover, a rotatable knife coöperating with the die-block at the end of the form, means for moving the knife toward and from the form, a track fixed in proximity to the die-block, and a roll movable with the knife and contacting with the track.

25. The combination with a die-block and a coöperating traveling form, of an oscillatory arm traveling with the form, and a knife rotatable upon the arm and coöperating with the die-block.

26. The combination with a die-block and a coöperating traveling form, of an arm traveling with the form, a knife rotatable upon the arm and coöperating with the die-block, an actuating arm connected to the knife-arm, and a cam coöperating with the actuating arm.

27. In a cup-making machine, the combination of a table provided with a coöperating surface, means for feeding material thereon, of a form revoluble about the center of the table and coöperatively associated cutting instrumentalities for cutting the blank of material on the operating surface, said form traveling over the operating surface and means for imparting rotary movement to the form about its axis so as to roll the material into cup form.

28. The combination with a form having a body-portion and a movable cutting and pressure head, of means for moving the head away from the body-portion, then toward said body portion and finally from the body-portion.

29. The combination with a form having a head, the form and head being relatively movable and also having together a movement of translation, of actuating means for causing the movement, and a plurality of cams for controlling the actuating means.

30. In a cup-making machine, a shaft, a form carried thereby, a block over which the form travels, a sleeve mounted to reciprocate on the shaft, and a head carried by the sleeve and coöperating with the form and block.

31. In a cup-making machine, a block, a shaft, a form carried thereby, a sleeve mounted to reciprocate on the shaft, a head carried by the sleeve and coöperating with the form and block, and means for moving the sleeve in two directions from its normal position.

32. In a cup-making machine, a shaft, a form carried thereby, a sleeve mounted to reciprocate on the shaft, a head carried by the sleeve and coöperating with the form, actuating means for the sleeve having a movement of translation, and a plurality of cams for successively moving the actuating means during its travel.

33. A container machine comprising pressure means having an operating surface, means for feeding material thereover, a form traveling over the operating surface, means for rotating the form, and means for removing material from the operating surface and holding it against the form, said holding means bearing a predetermined angular relation to the operating surface.

34. In a machine for making containers, the combination with a table provided with a die and rack, of a ring rotatable upon the table and being provided with bearings, a shaft journaled in the bearings, a form carried by the shaft and having knives coöperating with the die, and a pinion fixed to the shaft and meshing with the rack.

35. In a machine for making containers, the combination with a tapered form, of means for holding the side wall of a container upon the outside of a form, and means carried by the form for forcing a bottom from the smaller end of the form into place while the container-wall is held upon the form.

36. In a machine for making cups, the combination with a form, of means for holding the side wall of a cup upon the form, a plunger situated at the end of the form for coöperation with the cup-bottom, and means for moving the plunger outwardly from the form while the cup-wall is held in place upon said form.

37. The combination with a form, of means for moving the form, a plunger situated at one end of the form and being provided with an opening, and means controlled by the form-moving means for changing the air pressure through the opening.

38. The combination with a rotatable shaft, of a form movable by the shaft and being provided with openings, suction and blast-conduits which may be connected to the form, a single suction and blast valve in the conduits, actuating mechanism for the valve, and a cam fixed to the shaft and upon each rotation controlling the actuating mechanism to apply both suction and blast.

39. In a cup making machine, the combination with a block of a form and cutting instrumentalities movable over the block, means for feeding material to the block and means for elevating the material to a point above the block between it and the form and cutting means in position to be acted thereupon.

40. In a cup making machine, the combination with a block, of a form and cutting instrumentalities movable over the block, means for feeding material to the block and a reciprocating member situated adjacent to and normally below the operating surface of the block and means for moving the member to raise the material as it approaches the block into position to be acted upon.

41. In a container-machine, the combination with a block, of mechanism for intermittently feeding material to the block, a member situated adjacent to and normally below the operating surface of the block, and means operable with the feeding mechanism for raising the member to said operating surface whereby the material is directed over the block.

42. In a cup-machine, the combination with an inner form, of an outer form and a knife, and means for alternately moving the outer form and knife into alinement with the inner form.

43. The combination with a winding form, of a pressure-block, a knife coöperating with the pressure block at the end of the winding form, and an outer pressure-form coöperating with the winding form at the same end of said winding form as the knife.

44. In a cup-making machine the combination with a rotary traveling winding form, of a nontraveling die pressure block over which the winding form rolls, means for feeding the material to be made into cups between the winding form and the die pressure block and an outer pressure form moving with the rotary traveling winding form and coöperating therewith after the latter has been moved from the die pressure block.

45. The combination with an inner form, of a shaft, a sleeve surrounding the shaft, an arm projecting from the sleeve, an outer form carried by the arm, and actuating means for rotating the shaft and reciprocating the sleeve to effect the co-operation of the forms.

46. The combination with an inner form, of a shaft, a sleeve splined to the shaft, an arm projecting from the sleeve, an outer form carried by the arm, gearing for rotating the shaft and sleeve, and an arm for reciprocating the sleeve.

47. In a cup making machine in combination, an inner form around which the cup material is wound during its formation, a coöperating flange forming head reciprocally mounted with respect to said inner form said head adapted to coöperate with one end of the form, an outer form normally separated from said inner form and movable over the same and means for imparting movement to the outer form to move it over the inner form before the reciprocation of the head into engagement with the end of the inner form.

48. The combination with a conical inner form, of a head movable toward and from the smaller end of the form, and an outer form fitting the inner form provided with a groove for coöperation with the head in its movement from the inner form.

49. The combination with a traveling form, of a knife movable into and out of alinement with an end of the form, and an outer form thereafter movable into and out of coöperation with the traveling form.

50. The combination with a traveling container, of a receptacle for container-bottoms, and a member mounted independently of and traveling at the rear of the form, said member coöperating with the receptacle for delivering bottoms to the form.

51. The combination with a traveling container-form, of a receptacle for container-bottoms, a member mounted independently of and traveling at the rear of the form and out of the path of the receptacle, and means for moving the member into coöperation with the receptacle.

52. In a cup making machine a revoluble traveling container form, a receptacle for containing a plurality of circular container bottoms, means for individually feeding the bottoms laterally of the receptacle and means carried by the form for drawing a bottom up into position against one end of the form to be made a part of a cup.

53. The combination with a traveling container-form, of a receptacle for container bottoms, a member mounted independently of and traveling at the rear of the form to move the bottoms from the receptacle, and means carried by the form for drawing the bottoms toward said form.

54. In a cup-machine, the combination with a rotatable carrier, of a form mounted thereon, an arm fulcrumed upon the carrier at one side of the form, a receptacle for cup-bottoms, and means for moving the arm toward the receptacle.

55. In a cup-machine, the combination with a traveling form, of a fixed receptacle for a series of cup-bottoms, said receptacle having an opening, a yieldable member traveling with the form for successively contacting with the bottoms to force them through the opening into coöperation with the form, and means carried by the receptacle for controlling the projection of the yieldable member into the receptacle.

56. The combination with a traveling cup-form, of a tubular receptacle for cup-bottoms toward which the form travels, said receptacle being provided with a lateral opening and an end-closure in which is a slot, and a delivery-arm traveling with the form and having a surface running over the closure of the receptacle and a projection entering the slot.

57. The combination with a traveling cup-form, of a tubular receptacle for cup-bottoms, said receptacle being provided with a lateral opening and an end-closure in which is a slot, a delivery-arm traveling with the form and having a surface guided by the closure of the receptacle and a projection entering the slot, and means carried by the receptacle for guiding the projection into the slot as the arm in its travel approaches the receptacle.

58. In a cup-making machine, the combination with a conical form, a receptacle for containing a series of cup bottoms and a traveling arm moving with the form and coöperating with the receptacle and having a delivery finger upon the end of the arm yieldable longitudinally thereof and adapted to engage and move a cup bottom from the series into alinement with the form.

59. In a cup-making machine, the combination with a cup form of a tubular receptacle for containing a series of cup bottoms, said receptacle being provided with a lateral opening, and a slotted end, and a traveling arm moving with the form having a delivery finger provided with a reduced portion movable from a position externally of the receptacle into the slot to engage and move a single cup bottom to a position in alinement with one end of the traveling form.

60. The combination with a traveling cup-form, of a fixed tubular receptacle for cup-bottoms having an end-closure in which is a slot, a traveling arm movable with the form, and a delivery-finger mounted to slide upon the arm and also sliding over the inclosure of the receptacle.

61. In a machine for making containers, a segmental die, a revoluble form traveling over the die, means for feeding a strip of material over the die, and reciprocatory knives coöperating with the ends of the die before the form reaches said die.

62. In a machine for making containers, a segmental die, a form revoluble about the axis of the die, means for feeding a strip of material over the die, oscillatory arms provided with knives coöperating with ends of the die and extending radially thereto, and means for simultaneously moving the arms.

63. In a machine for making containers, a segmental die, a form traveling over the die, revoluble knives coöperating with the circular edges of the die, and reciprocatory knives coöperating with ends of the die.

64. In a machine for making containers, a segmental die, a form traveling over the die, circular knives traveling with the form and coöperating with the circular edges of the die, and reciprocatory knives coöperating with ends of the die.

65. In a container-machine, the combination with a traveling form, cutting means traveling with the form, means for moving the cutting means toward and from the form, means for delivering container-bottoms to the form, means for holding the bottoms upon the form, and means for winding material about the form and bottom.

66. In a container-machine, the combination with a traveling form, of means for delivering container-bottoms to the form, means for holding the bottoms upon the form, means for winding material about the form and bottom, and means for forcing the bottom away from the form into the wound material.

67. In a container-machine, the combination with a form, of means for delivering container-bottoms to the form, means for holding the bottoms upon the form, means for winding material about the form and bottom, and an outer form covering the wound material and bottom upon the first-mentioned form.

68. In a container-machine, the combination with a form, of means for delivering container-bottoms to the form, means for holding the bottoms upon the form, means for winding material about the form and bottom, an outer form covering the wound material and bottom, and means for forcing the bottom toward the outer form.

69. In a container-machine, the combination with a traveling form, of means for delivering container-bottoms to the form, means for winding material about the form and bottom, and means traveling with said form for producing a flange upon the wound material.

70. In a container-machine, the combination with a form, of means for delivering container-bottoms to the form, means for winding material about the form and bottom, and means situated at opposite ends of the form for forcing the bottom away from said form and for producing a flange upon the wound material.

71. In a container-machine, the combination with a form, of means for delivering container bottoms to the form, means for winding material about the form and bottom, means situated at opposite ends of the form for forcing the bottom away from said form and for producing a flange upon the wound material, and an outer form coöperating with the winding form.

Signed at New York (borough of Manhattan), in the county and State of New York, this 15th day of May, 1911.

LAWRENCE W. LUELLEN.

Witnesses:
ROBT. C. MCGONIGAL,
MAURICE W. RANDALL.